(12) United States Patent
Kaneko

(10) Patent No.: US 6,568,444 B1
(45) Date of Patent: May 27, 2003

(54) PNEUMATIC RADIAL TIRE HAVING SMALL NEGATIVE RATIO AND SMALL TREAD GROUND CONTACTING WIDTH TO RIM WIDTH

(75) Inventor: Takashi Kaneko, Hannou (JP)

(73) Assignee: Bridgestone Corporation, Tokyo (JP)

( * ) Notice: Subject to any disclaimer, the term of this patent is extended or adjusted under 35 U.S.C. 154(b) by 844 days.

(21) Appl. No.: 08/871,582

(22) Filed: Jun. 9, 1997

(30) Foreign Application Priority Data

Jun. 11, 1996 (JP) .............................................. 8-149235
Mar. 18, 1997 (JP) .............................................. 9-064426

(51) Int. Cl.⁷ ........................... B60C 3/04; B60C 11/03; B60C 11/11
(52) U.S. Cl. ........................... 152/209.18; 152/209.27; 152/209.28; 152/454; 152/DIG. 3
(58) Field of Search ..................... 152/209 R, 209 D, 152/454, 209 NT, DIG. 3, 209.18, 209.27, 209.28

(56) References Cited

U.S. PATENT DOCUMENTS

| | | | | |
|---|---|---|---|---|
| 1,969,088 A | * | 8/1934 | Maranville | 152/209 NT |
| 2,109,691 A | * | 3/1938 | D'ayguesvives | 152/209 R |
| 3,515,196 A | * | 6/1970 | Floria | 152/454 |
| 4,034,790 A | * | 7/1977 | Johannsen et al. | 152/209 NT |
| 4,328,851 A | * | 5/1982 | Randle | 152/454 |
| 4,345,634 A | * | 8/1982 | Giron | 152/454 |
| 4,434,830 A | * | 3/1984 | Landers et al. | 152/454 |
| 4,832,099 A | * | 5/1989 | Matsumoto | 152/209 R |
| 5,000,239 A | * | 3/1991 | Brayer et al. | 152/454 |
| 5,309,963 A | * | 5/1994 | Kakumu et al. | 152/209 R |
| 5,437,321 A | * | 8/1995 | Breny | 152/454 |
| 5,630,892 A | * | 5/1997 | Williams et al. | 152/454 |

FOREIGN PATENT DOCUMENTS

| | | | | |
|---|---|---|---|---|
| DE | 2534840 | * | 2/1977 | 152/454 |
| EP | 0 402 303 A1 | | 12/1990 | |
| EP | 0 465 188 A1 | | 1/1992 | |
| EP | 0 508 090 A | | 10/1992 | |
| GB | 1541673 | * | 3/1979 | |
| GB | 1549010 | | 7/1979 | |
| GB | 2 132 574 A | | 7/1984 | |
| JP | 58-194605 | * | 11/1983 | 152/209 D |

OTHER PUBLICATIONS

Blow, Rubber Technology and Manufacture, 1971, pp. 349-356.*
Patent Abstracts of Japan, vol. 18, No. 186 (M-1585), Mar. 30, 1994 (JP 5-345506).
European Search Report dated Sep. 26, 1997.

* cited by examiner

Primary Examiner—Steven D. Maki
(74) Attorney, Agent, or Firm—Sughrue Mion, PLLC

(57) ABSTRACT

A pneumatic radial tire having excellent steering stability, resistance to hydroplaning and noise reduction comprises a carcass, a belt and a tread portion provided with a plurality of tread grooves and having an aspect ratio of not more than 50%, in which a ratio of ground contacting width of tire tread to rim width under measuring conditions defined in ETRTO is less than 0.85 and a negative ratio is not more than 25%.

6 Claims, 4 Drawing Sheets

FIG._2
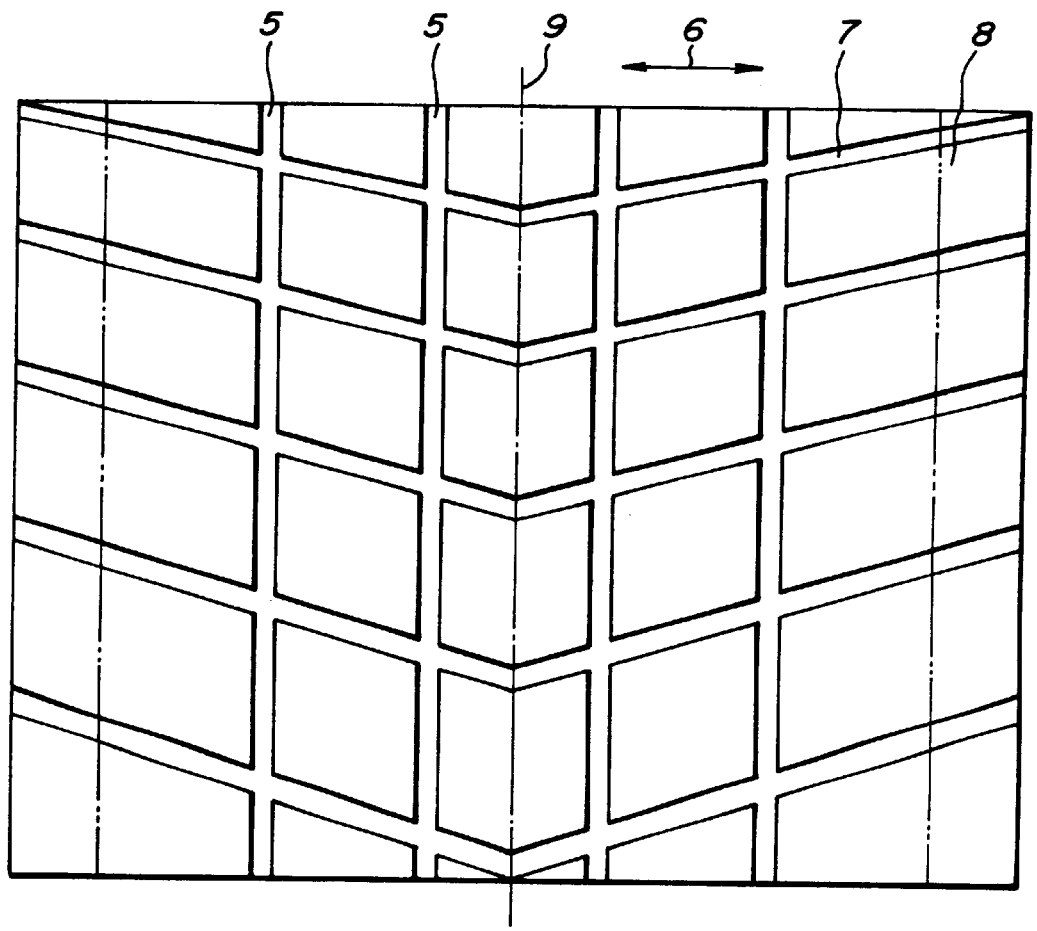

FIG_3
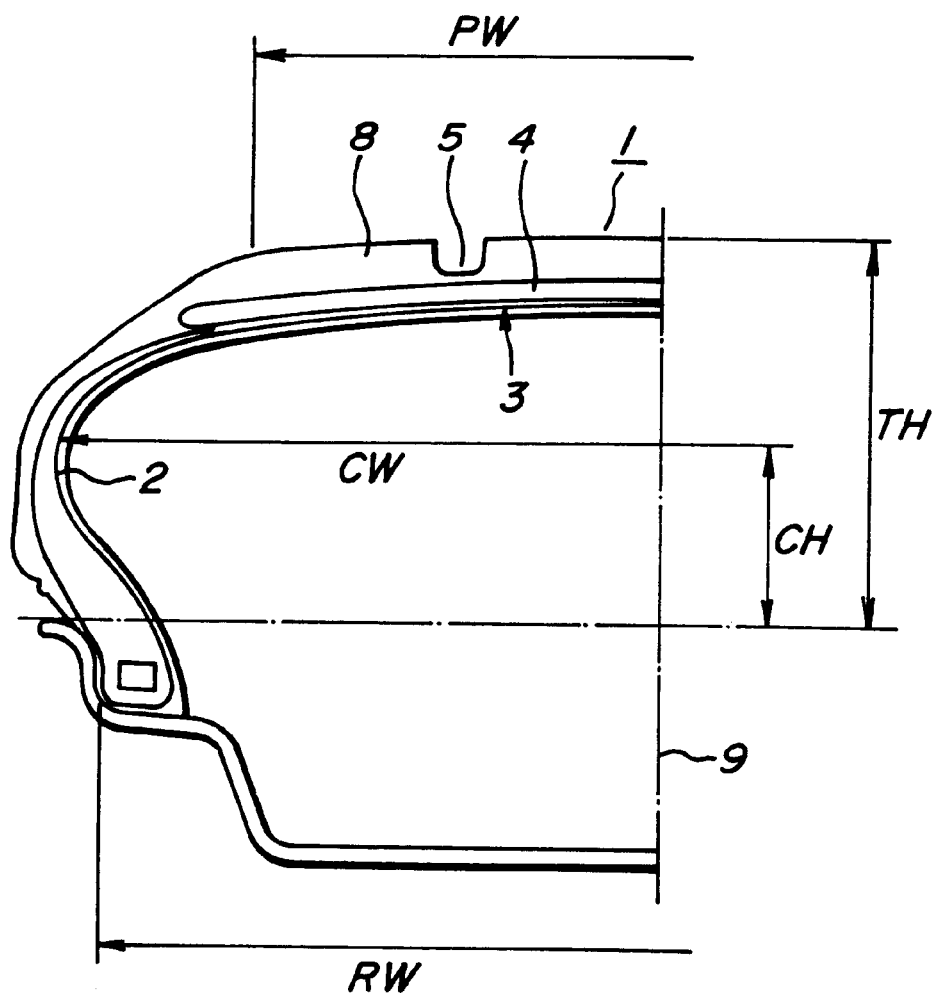

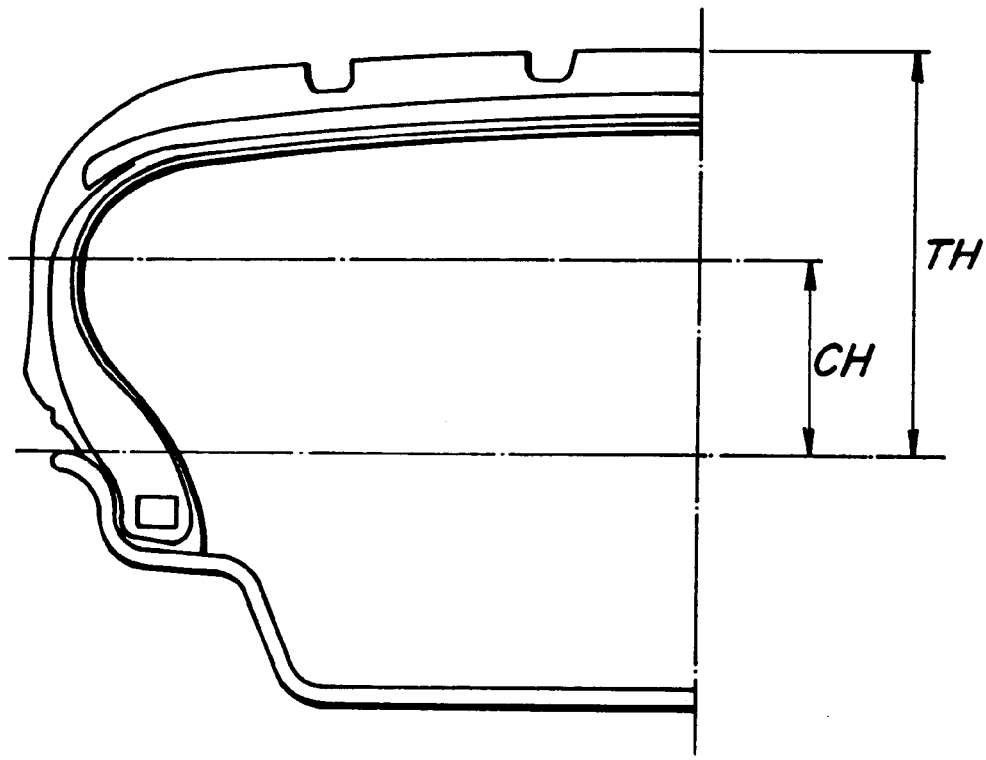
FIG_4
*PRIOR ART*

PNEUMATIC RADIAL TIRE HAVING SMALL NEGATIVE RATIO AND SMALL TREAD GROUND CONTACTING WIDTH TO RIM WIDTH

BACKGROUND OF THE INVENTION

1. Field of the Invention

This invention relates to a pneumatic radial tire having an aspect ratio of not more than 50% for use in vehicles running on general-purpose road, circuit course and the like, and more particularly to a high-performance tire balanced and satisfying a steering stability and a resistance to hydroplaning and reducing noise.

2. Description of Related Art

For example, the pneumatic radial tire used in sport-type vehicle and having an aspect ratio of not more than 50% or so-called high-performance tire attaches much importance to steering stability and resistance to hydroplaning among performances required in usual passenger car tires, but did not put other performances such as noise reduction and the like into problem. Recently, there is a tendency of raising regulation to noise in all the countries of the world, so that a demand exists to reduce the noise even in the high-performance tire likewise the usual passenger car tire.

In order to obtain sufficient steering stability in the high-performance tire, it is known to increase a ground contacting width of a tread as compared with the usual passenger car tire. Concretely, the tread ground contacting width of the high-performance tire is generally within a range of 0.85–1.00, particularly 0.9–1.0 as a ratio to a rim width.

Although the resistance to hydroplaning is improving by the adoption of a directional pattern based on the water flowing analysis or the like, a negative ratio of tread grooves arranged in a tread (a ratio of total area of tread grooves formed in the tread portion to an area of the tread portion) is generally set to about 33–40%, which is larger than the negative ratio (about 30%) of the usual tire, from a viewpoint of making up for the degradation of the resistance to hydroplaning resulted from the size of the ground contacting width.

In addition, a groove width of a tread groove arranged in the tread portion of the high-performance tire is generally within a range of 8 mm to 10 mm or more. This is larger than a groove width (5–8 mm) of a main groove and a sub-groove in the usual tire, when the main groove extends along a circumference of the tire or obliquely at a relatively small inclination angle with respect to the circumference or the sub-groove extends along a widthwise direction of the tire or obliquely at a relatively small inclination angle with respect to the widthwise direction for ensuring a large groove area in the small groove number so as not to decrease a block rigidity of the tread.

In general, there is a relationship between the tread ground contacting width and the negative ratio considering the steering stability and the resistance to hydroplaning as mentioned below. That is, it is useful to increase the tread ground contacting width to further improve the steering stability. In this case, however, the discharging ability of water entrained in a ground contact region of the tire (particularly central region) toward the side of the tire lowers (which results from a fact that a distance from the central region to an end of the tread ground contacting width becomes long) to bring about the degradation of the resistance to hydroplaning. Therefore, it is required to increase the negative ratio in order to make up for such a degradation. On the other hand, it is useful to increase the negative ratio for more improving the resistance to hydroplaning. In the latter case, however, the substantial ground contact area of the tread decreases to degrade the steering stability. Therefore, it is required to increase the tread ground contacting width in order to make up for such degradation.

If it is intended to further improve either one of the steering stability and the resistance to hydroplaning by the conventional technique of adjusting the tread ground contacting width and the negative ratio as mentioned above, therefore, it is required to take steps for preventing the degradation of the other performance together and finally both of the tread ground contacting width and the negative ratio should be increased. For this purpose, the tire size should be made large.

When both of the tread ground contacting width and the negative ratio are increased, the total groove area of the tread grooves inclusive of the above main grooves and sub-grooves located in the ground contact region of the tread increases and also a length of a front edge portion in the ground contact region of the tire increases. This results in the occurrence of large noise because sound generated by contacting the tire with ground in the ground contact region of the tire is resonantly enlarged in a tubular region defined between the tire and the road surface by the main groove. This creates a so-called columnar resonance sound and also impact sound of a corner part of the sub-groove is increased.

SUMMARY OF THE INVENTION

It is, therefore, an object of the invention to provide pneumatic radial tires simultaneously establishing the steering stability and the resistance to hydroplaning by using a technique entirely different from the conventional technique of increasing both of the tread ground contacting width and the negative ratio and reducing the noise level.

According to the invention, there is the provision of a pneumatic radial tire comprising a radial carcass toroidally extending between a pair of bead portions, a belt superimposed about a crown portion of the carcass and a tread portion disposed on the belt and provided with a plurality of tread grooves and having an aspect ratio of not more than 50%, characterized in that when the tire is mounted onto a measuring rim defined by European Tyre and Rim Technical Organization (ETRTO) and vertically placed on a flat plate under an internal pressure of 2.5 bar at a static state and a load corresponding to 70% of a maximum load capacity determined by load index in accordance with the above internal pressure is applied thereto, a ratio of ground contacting width (PW) of tire tread to rim width (RW) is less than 0.85 and a negative ratio is not more than 25%.

The term "tread groove" used herein includes fine groove and sipe in addition to grooves having a relatively wide groove width such as main grooves and sub-grooves arranged in the tread portion.

In a preferable embodiment of the invention, the tread groove is a main groove extending at an inclination angle within a range of 0–45° with respect to the circumference of the tire and/or a sub-groove extending at an inclination angle within a range of 0–44°, preferably 5–30° with respect to the widthwise direction of the tire.

In another preferable embodiment of the invention, a groove width of a portion corresponding to not less than 80% of all main grooves arranged in the tread portion is not more than 5 mm, and a groove width of a portion corresponding to not less than 90% of all sub-grooves arranged in the tread portion is not more than 6 mm. A groove width of a portion corresponding to not less than 70% of all tread grooves including the main grooves and sub-grooves is within a range of 0.5–3.0 mm, and a maximum width of a carcass line (CW) of the carcass is smaller than the rim width (RW) and a distance (CH) between a position of a rim flange and a position of the maximum width of the carcass line shifted in a widthwise direction of the tire and projected onto an equatorial plane of the tire at section of the tire is not more than ⅓ of a distance (TH) between a position of a rim flange and a position of a sectional height of the tire projected onto the equatorial plane.

BRIEF DESCRIPTION OF THE DRAWINGS

The invention will be described with reference to the accompanying drawings, wherein:

FIG. 2 is a schematically developed view of a tread pattern in a tire used in Examples 3 and 4;

FIG. 3 is a diagrammatically left-half section view of another embodiment of the pneumatic radial tire according to the invention; and FIG. 4 is a diagrammatically left-half section view of the conventional high-performance tire.

DESCRIPTION OF THE PREFERRED EMBODIMENTS

Figure 1:
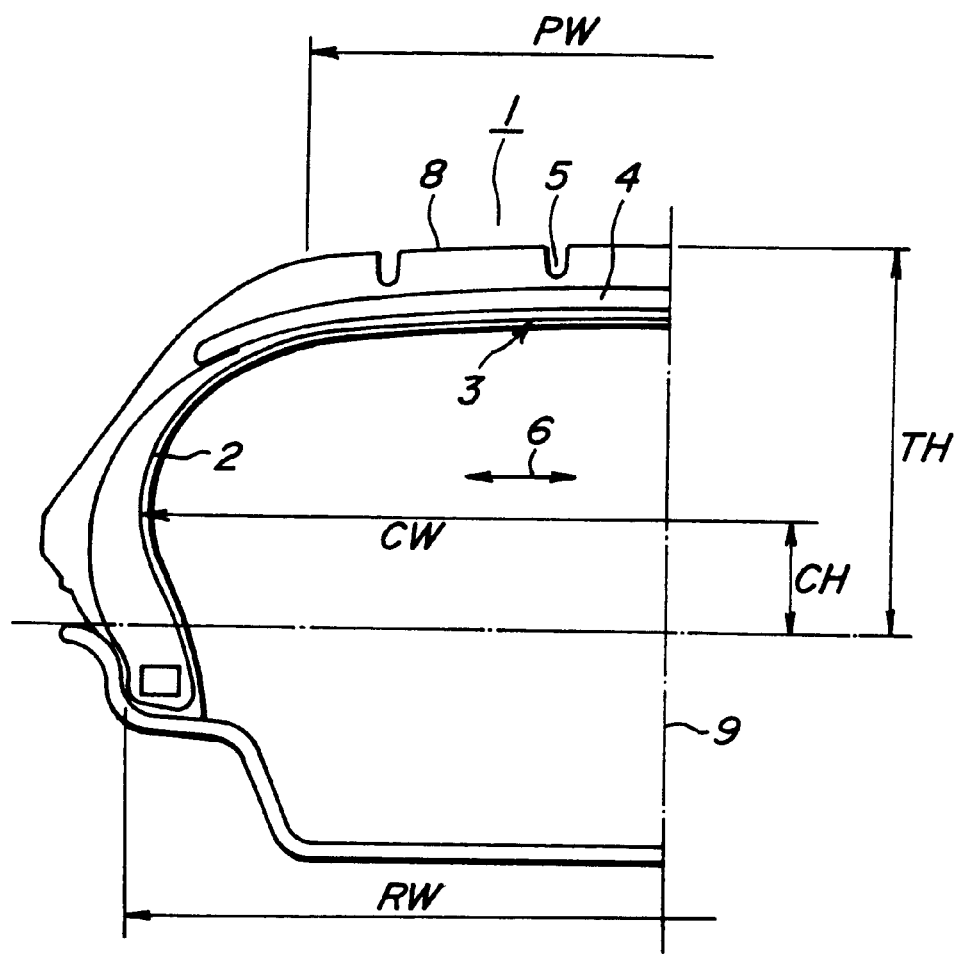
FIG. 1 is a diagrammatically left-half section view of an embodiment of the pneumatic radial tire (or high-performance tire) according to the invention.

In FIG. 1 is sectionally shown a typical embodiment of the pneumatic radial tire according to the invention and FIG. 2 shows a tread pattern of this tire, in which numeral 1 is a pneumatic radial tire, numeral 2 a radial carcass, numeral 3 a crown portion of the radial carcass, numeral 4 a belt, numeral 5 a main groove, numeral 6 a widthwise direction of the tire, numeral 7 a sub-groove, and numeral 8 a tread portion.

The tire 1 is a pneumatic radial tire having an aspect ratio of not more than 50% and comprises the radial carcass 2 toroidally extending between a pair of bead portions and the tread portion 8 arranged outward on the crown portion 3 of the carcass and provided with the belt 4, main grooves 5 and sub-grooves 7.

The tire according to the invention has as a main constructive feature that a tread ground contacting width to a rim width and a negative ratio are made small as compared with those of the conventional high-performance tire. That is, the ratio of tread ground contacting width (PW) of tire to rim width (RW) under the aforementioned conditions defined by ETRTO is less than 0.85, preferably within a range of 0.70–0.82 and the negative ratio is not more than 25%, preferably 15–22%.

By adopting such a construction, the reduction of noise can be attained while balancing and satisfying both the steering stability and the resistance to hydroplaning.

That is, the discharge ability of water entrained in the ground contact region of the tire (particularly central region) toward the side of the tire can be enhanced by making the tread ground contacting width small, whereby the resistance to hydroplaning can be improved. In this case, a substantial decreasing quantity of tread ground contact area accompanied with the decrease of the tread ground contacting width can be supplemented by setting the negative ratio to a small value. As a result, the steering stability becomes equal to or greater than that of the conventional high-performance tire. In addition, since the tread ground contacting width is small, the front edge length of the ground contact region of the tire is short and it is possible to decrease a sound generating source to make an impact sound by a corner part of the sub-groove small and hence it is possible to reduce the noise level.

The main groove 5 may be a straight groove extending along the circumference of the tire (FIG. 2) or a zigzag circumferential groove or a main slant groove extending obliquely at an inclination angle of 0–45°, preferably 5–30° with respect to the circumference of the tire so as to form a directional pattern. In case of the main slant groove, there may be a straight inclination or a curved inclination or a combination thereof and also the inclination angle may be constant or gradually be increased, so that a proper modification can properly be selected according to the need.

The number of main grooves 5 is not particularly restricted, but when the main groove 5 is a straight groove as shown in FIG. 2, the number of main grooves is preferable to be 2–5. Furthermore, a portion corresponding to not less than 80% of all main grooves arranged in the tread portion is preferable to have a groove width of not more than 5 mm from a viewpoint of noise reduction.

When columnar resonance sound generated at the main groove 5 by contacting the tire with road surface is examined in relation to the groove width of the main groove 5, it has been confirmed that when the groove width is more than 5 mm but not more than 15 mm, it tends to increase the columnar resonance sound. Moreover, the groove width of more than 15 mm is favorable from a viewpoint of noise reduction, but is very difficult to attain the negative ratio of not more than 25%.

The sub-groove may be a lug groove extending along the widthwise direction of the tire or a slant sub-groove extending obliquely at an inclination angle of 0–44°, preferably 5–30° with respect to the widthwise direction of the tire as shown in FIG. 2. In the latter case, the arranging shape and inclination angle of the sub-groove and the like may properly be changed according to need.

The number of the sub-grooves 7 is not particularly restricted. Furthermore, a portion corresponding to not less than 90% of all sub-grooves arranged in the tread portion is preferable to have a groove width of not more than 6 mm from a viewpoint of noise reduction. When the groove width exceeds 6 mm, the impact sound by the corner part of the sub-groove becomes larger.

In addition, a portion corresponding to not less than 70% of all tread grooves arranged in the tread portion inclusive of the main grooves and the sub-grooves is preferable to have a groove width of 0.5–3.0 mm as a natural result through the aforementioned action to the noise reduction.

When the maximum width of the carcass line (CW) of the carcass is smaller than the rim width (RW) and the distance (CH) between a position of the rim flange and a position of the maximum width of the carcass line shifted in a widthwise direction of the tire and projected onto an equatorial plane of the tire in a section of the tire is not more than ⅓ of the distance (TH) between the position of the rim flange and a position of a sectional height of the tire projected onto the equatorial plane, a carcass length ranging from the rim flange to an end of the ground contacting width (periphery length) can be made shorter than that of the conventional high-performance tire (FIG. 3), whereby the rigidities of the side portion in all directions are enhanced to increase all rigidities in a loading direction, widthwise direction and circumferential direction of the tire and hence the steering stability can be more improved.

Moreover, the increase of the rigidity in the loading direction of the tire can improve vibration damping property but also develop an effect of reducing the rolling in the change of running lane.

Although only one embodiment of the invention has been described, various modifications may be conducted within a scope of the invention.

The following examples are given in illustration of the invention and are not intended as limitations thereof.

EXAMPLE 1

There is prepared a tire having a tire size of 255/40ZR17 as shown in FIG. 3, which comprises a radial carcass 2 of a single carcass ply toroidally extending between a pair of bead portions. A belt is superimposed about a crown portion 3 of the carcass and comprised of two rubberized cord layers. A tread portion is provided with two main grooves 5 extending in the circumferential direction of the tire and plural sub-grooves 7 extending at an inclination angle of 30° with respect to the widthwise direction of the tire. The ratio (PW/RW) of tread ground contacting width to rim width under the aforementioned conditions defined by ETRTO is 0.82 and the negative ratio is 22%.

Further, all main grooves arranged in the tread portion have a groove width of 9 mm, while all sub-grooves arranged in the tread portion has a groove width of 7.0 mm. Moreover, the ratio of maximum width of carcass line to rim width is 1.07, and the distance (CH) between position of the rim flange and position of the maximum width of carcass line is 50% of the distance (TH) between position of the rim flange and position of tire sectional height.

The other tire structures are the same as the conventional tire product.

EXAMPLE 2

The tire of this example has substantially the same structure as in Example 1 except that the number of the main grooves is four, and a portion corresponding to 90% of all main grooves arranged in the tread has a groove width of 4.5 mm and the remaining portion has a groove width of 6 mm.

EXAMPLE 3

The tire of this example has substantially the same structure as in Example 2 except that a portion corresponding to 95% of all sub-grooves arranged in the tread portion has a groove width of 5 mm and the remaining portion has a groove width of 6–10 mm.

EXAMPLE 4

The tire of this example having a radial section as shown in FIG. 1 has substantially the same structure as in Example 3 except that the ratio of maximum width of carcass line to rim width is 0.98, and the distance between position of the rim flange and position of the maximum width of carcass line is 31% of the distance between position of the rim flange and position of tire sectional height.

COMPARATIVE EXAMPLE 1

The tire of this comparative example has substantially the same structure as in Example 2 except that the ratio (PW/RW) of tread ground contacting width to rim width is 0.95 and the groove width of the main groove is 5 mm (constant).

COMPARATIVE EXAMPLE 2

The tire of this comparative example has substantially the same structure as in Example 2 except that the negative ratio is 35% and the groove width of the main groove is 11 mm (constant).

CONVENTIONAL EXAMPLE

The tire of the conventional example is the conventional high-performance tire shown in FIG. 4 having substantially the same structure as shown in FIG. 1, in which the ratio (PW/RW) of tread ground contacting width to rim width is 0.95 and the negative ratio is 35% and the distance (CH) between position of the rim flange and position of the maximum width of carcass line is 50% of the distance (TH) between position of the rim flange and position of tire sectional height.

All of the above tires have a basic tread pattern as shown in FIG. 2.

(Test Method)

The tests for evaluating the steering stability, resistance to hydroplaning and noise level are made with respect to each of the above tires.
(1) Steering Stability Steering stability is evaluated on a dry road surface and on a wet road surface, respectively.

The steering stability on a dry road surface is evaluated by a driver's subjective judgement for feeling results on braking and traction properties, handling responsibility, road gripping property in the steering and controllability exceeding slip limit when the test tire is actually run on a test course consisting of a high speed circuit including a long straight portion, a handling road having many curved portions and a flat road having a radius of about 100 m at a wide speed region ranging from low speed to high speed.

The steering stability on wet road surface is evaluated by a driver's subjective judgement for the same feeling results as described above when water is sprinkled on a road surface of the test course at a water depth of about 0–5 mm.
(2) Resistance to Hydroplaning The resistance to hydroplaning is evaluated by an average value of three measured results on a running speed causing the hydroplaning when the test tire is actually run on the test course having a water depth of 6 mm in a straight running direction.
(3) Noise Level The test tire is trained at a speed of 60–80 km/h and an internal pressure of 3.0 bar under a load corresponding to the seating capacity and then the internal pressure is again adjusted to 3.0 bar and thereafter run at a speed of 55 km/h, during which noise level is measured by placing two microphones at an interval of 50 cm in a position separated from a center line of the running vehicle by 7.5 m and from a ground surface by a height of 1.2 m to evaluate the noise level.

The evaluated results are shown in Table 1.

In Table 1, the steering stability on each of dry and wet road surfaces is represented by an index value on the basis that the conventional example is 100, while the resistance to hydroplaning is represented by an increment of speed (km/h) based on the occurrence speed of hydroplaning in the conventional example. The larger the numerical value, the better the property. The noise level is represented by a lowering quantity (dB) based on the noise level in the conventional example, in which the smaller the numerical value, the better the noise reduction.

TABLE 1

| | Steering stability on dry road surface | Steering stability on wet road surface | Resistance to hydroplaning | Noise level |
|---|---|---|---|---|
| Example 1 | 100 | 100 | +4 | −1.2 |
| Example 2 | 102 | 101 | +4 | −1.9 |
| Example 3 | 101 | 100 | +5 | −2.1 |
| Example 4 | 106 | 105 | +5 | −2.2 |
| Comparative Example 1 | 103 | 90 | −6 | −0.7 |
| Comparative Example 2 | 95 | 101 | +6 | −0.8 |
| Conventional Example | 100 | 100 | standard | standard |

As seen from Table 1, the tires of Examples 1–4 are synthetically excellent in the steering stability, the resistance to hydroplaning and the noise level.

According to the invention, it is possible to provide a pneumatic radial tire having a small aspect ratio or so-called high-performance tire in which the steering stability and the resistance to hydroplaning can simultaneously en established without increasing the tire size and the noise level is reduced.

What is claimed is:

1. A combination of pneumatic radial tire mounted on a measuring rim, said combination comprising; said tire having a radial carcass toroidally extending between a pair of bead portions, a belt superimposed about a crown portion of the carcass and a tread portion disposed on the belt and provided with a plurality of tread grooves and having an aspect ratio of not more than 50%, wherein, the tire is mounted onto said measuring rim that is defined by the European Tyre and Rim Technical Organization (ETRTO) and when said mounted tire is vertically placed on a flat plate and inflated under an internal pressure of 2.5 bar at a static state and a load corresponding to 70% of a maximum load capacity determined by a tire load index determined in accordance with said internal pressure is applied thereto, a ratio of ground contacting width of said tread portion to rim width is less than 0.85 and a negative ratio of said tread portion is not more than 25%.

2. A combination according to claim 1, wherein the tread grooves comprise main grooves extending at an inclination angle within a range of 0–45° with respect to the circumference of the tire and/or sub-grooves extending at an inclination angle within a range of 0–44° with respect to the widthwise direction of the tire.

3. A combination according to claim 2, wherein a groove width of a portion corresponding to not less than 80% of all main grooves arranged in the tread portion is not more than 5 mm.

4. A combination according to claim 2, wherein a groove width of a portion corresponding to not less than 90% of all sub-grooves arranged in the tread portion is not more than 6 mm.

5. A combination according to claim 1, wherein the tread grooves comprise main grooves and sub-grooves and a groove width of a portion corresponding to not less than 70% of all tread grooves including the main grooves and sub-grooves is within a range of 0.5–3.0 mm.

6. A combination according to claim 1, wherein a maximum axial width of a carcass line of the carcass is smaller than the axial rim width of said measuring rim and a distance measured radially between a position at an end of a rim flange of the measuring rim and a position on the carcass line shifted in a widthwise direction of the tire and projected onto an equatorial plane of the tire at a section of the tire is not more than ⅓ of a radial distance measured between the position of the end of the rim flange of the measuring rim and a position of a sectional height of the tire projected onto the equatorial plane.

* * * * *